May 14, 1968    T. L. HEYING ET AL    3,383,419

PARA-CARBORANE AND THE PREPARATION THEREOF

Filed Nov. 18, 1964

○ BORON

⊘ CARBON

○ HYDROGEN ON CARBON (HYDROGEN ATOMS ON BORON OMITTED FOR CLARITY)

INVENTORS.
THEODORE L. HEYING
STELVIO PAPETTI
BY
Walter D. Hunter
AGENT

United States Patent Office 3,383,419
Patented May 14, 1968

3,383,419
PARA-CARBORANE AND THE
PREPARATION THEREOF
Theodore L. Heying, North Haven, and Stelvio Papetti,
Hamden, Conn., assignors to Olin Mathieson Chemical
Corporation, a corporation of Virginia
Filed Nov. 18, 1964, Ser. No. 412,082
4 Claims. (Cl. 260—606.5)

This invention relates to para-carborane and to a method for its manufacture.

Figure 1:
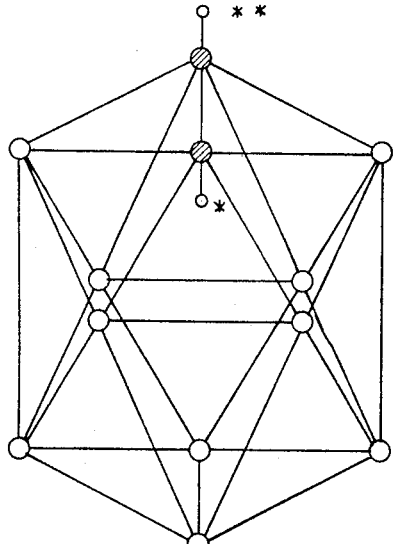
Figure 1A:
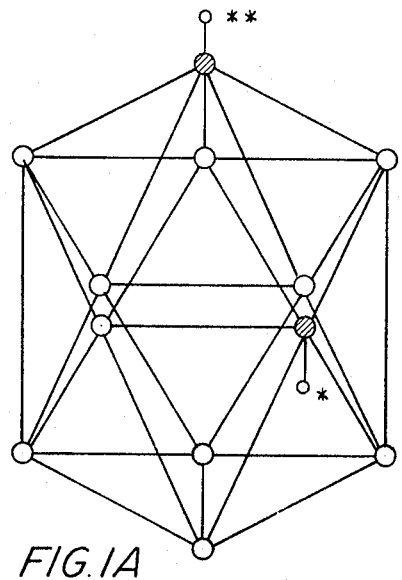
Figure 1B:
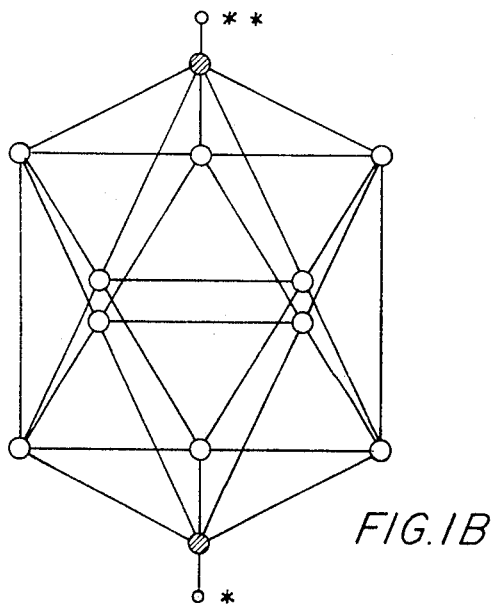

Ortho- and meta-carborane are known in the art. The structure of these two materials has been described by R. Hoffmann and W. N. Lipscomb, Inorg. Chem., 2, 231 (1963), by H. Schroeder and A. Vickers, ibid., 1317 and J. Potenza and W. N. Lipscomb, J. Am. Chem. Soc., 86, 1874 (1964). The compound ortho-carborane which has the formula:

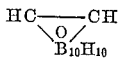

can be prepared by the method described in Ager, Heying, and Mangold application Ser. No. 741,976, filed June 13, 1958 and now abandoned, by reacting decaborane and in the presence of tetrahydrofuran for 12 hours at a temperature of about 125° C. in an autoclave pressured to 100 p.s.i. with acetylene. The structural formula of ortho-carborane is shown as FIGURE 1.

When organoboranes (i.e. carboranes) of the class:

wherein R and R' are each selected from the group consisting of hydrogen and an alkyl radical containing from 1 to 5 carbon atoms are heated to a temperature of above 400° C. a thermal isomerization takes place and the so-called meta-carboranes are formed. For example, the compound ortho-carborane ($B_{10}H_{10}[C(H)C(H)]$) can be converted to meta-carborane ($HCB_{10}H_{10}CH$) by heating in a sealed tube at a temperature of about 475° C. for 5 to 20 hours. The structural formula of the compound meta-carborane or neocarborane, as it is sometimes called, is shown as structural formula FIGURE 1-A. The structural formula of the novel para-carborane of this invention is shown as FIGURE 1-B.

In the method of this invention the novel para-carborane is prepared by sealing ortho-carborane, meta-carborane, or a mixture of the two in a heavy-walled combustion tube, a pressure bomb or any other suitable container which preferably has previously been flushed with nitrogen and heating the container and contents at a temperature of from about 550° C. to about 630° C. for about 1 to about 30 hours or more. At the conclusion of the heating period the container is allowed to cool to room temperature and then opened after which the product mixture is removed by extraction with several portions of a lower dialkyl ether, such as diethyl ether, diisopropyl ether, di-n-propyl ether dibutyl ether, etc. The ether solution is then evaporated to dryness and the residue sublimed at 100° C. under vacuum to yield the crude product. The para-carborane product is recovered by dissolving the sublimate in a suitable solvent such as benzene, petroleum ether, hexane, acetone and dialkyl ethers, such as diethyl ether and then fractionating the solution through a vapor phase chromatograph, using, for example a 5 ft. column packed with a methyl silicone rubber, a polymethyl siloxane, or a polyphenyl siloxane on 60–80 mesh firebrick at about 150° C. with a helium flush at a flow rate of about 40 cc. per minute. Other methods can be employed for recovering the pure para-carborane, such as fractional crystallization, zone refining etc.

Para-carborane prepared in accordance with the method of this invention, when incorporated with suitable oxidizers such as ammonium perchlorate, potassium perchlorate, sodium perchlorate, ammonium nitrate and the like, yields solid propellants suitable for rocket power plants and other jet propelled devices. Such propellants burn with high flame speeds, have high heats of combustion and are of the high specific impulse type. Para-carborane of this invention when incorporated with oxidizers is capable of being formed into a wide variety of grains, tablets, and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

The following examples illustrate various embodiments of this invention and are to be considered not limitative.

Example I 2.3 g. of meta-carborane was placed in a nitrogen-flushed, 100-ml. stainless steel autoclave and heated at 615° for 17 hr. Sublimation of the residue (50° at 0.1 mm.) yielded 0.29 g. of sublimate. This sublimate was dissolved in 0.4 ml. of benzene and subjected to vapor phase chromatography at 150° using a 5 ft. column packed with 20 percent methyl silicone rubber on firebrick. Two components were separated; the component first released was para-carborane followed rather closely by meta-carborane. Ortho-carborane was found to pass through the column much more slowly and none was detected in the mixture above:

Analysis.—Found for $C_2B_{10}H_{12}$: C, 17.1; H, 8.4; B, 75.4.

The para-carborane, which was recovered in 6.5 percent yield, melted at 259–261°.

Conclusive proof of the para orientation was obtained from the $^{11}B$ n-m-r spectrum which consisted of only one doublet arising from the ten geometrically equivalent boron atoms. On decoupling this doublet collapsed to a singlet. This is in accord with the theoretical spectrum deduced by Schroeder and Vickers for a p-carborane.

Examples II–XI

A number of additional experiments were performed in the same manner as described in Example I. After the heating period, the crude product was extracted with three 10 ml. portions of ethyl ether following which the combined ether extract was evaporated to dryness and the residue sublimed at 100° C. under vacuum. Other pertinent details relating to these examples is given in Table 1.

TABLE I

| Ex. | Starting material | | Temp. (°C.) | Time (hours) | Sublimate | | Weight of para-carborane recovered (grams) | Percent yield of para-carborane |
|---|---|---|---|---|---|---|---|---|
| | Ortho-carborane (grams) | Meta-carborane (grams) | | | Weight recovered (grams)[1] | Ratio of meta-carborane to para-carborane[2] | | |
| II | | 1.5 | 620 | 5 | | 60/40 | | |
| III | | 2.0 | 615 | 2 | 2.0 | 80/20 | | 20 |
| IV | | 1.0 | 620 | 5 | | 55/45 | | |
| V | | 1.5 | 620 | 6.5 | | 60/40 | | |
| VI | | 2.3 | 615 | 17 | .29 | 55/45 | | 5.7 |
| VII | | 2.5 | 615 | 5 | .92 | 50/50 | .46 | 18.4 |
| VIII | | 3.0 | 595 | 18 | .77 | 50/50 | .374 | 12.8 |
| IX | 2.9 | | 615 | 4.5 | 1.05 | 55/45 | | 16.3 |
| X | 3.0 | | 565 | 18 | 1.2 | 65/35 | .30 | 10.7 |
| XI | 3.1 | | 580 | 18 | 1.21 | 55/45 | | 17.5 |

[1] Recovered material by sublimation at 100° C. under vacuum, after the heat treatment.
[2] The ratio of meta-carborane to para-carborane in the sublimate material has been found experimentally (V.P.C. refractometer) or estimated from relative intensity of certain peaks of the infrared spectrum (characteristic band at 9.8μ for ortho-carborane, characteristic band at 9.2μ for para-carborane.

The para-carborane produced by practicing the method of this invention can be employed as an ingredient of solid propellant compositions in accordance with general procedures which are well understood in the art, inasmuch as the para-carborane produced by practicing the present process is readily oxidized using conventional solid oxidizers such as ammonium perchlorate, potassium perchlorate, sodium perchlorate, ammonium nitrate and the like. In formulating a solid propellant composition employing para-carborane, generally from 10 to 35 parts by weight of boron containing material and from 65 to 90 parts by weight of the oxidizer are used. In the propellant, the oxidizer and the para-carborane are formulated in intimate admixture with each other, as by finely subdividing each of the materials and thereafter intimately mixing them. The purpose in doing this, as the art is well aware, is to provide proper burning characteristics in the final propellant. In addition to the oxidizer and the oxidizable material, the final propellant can also contain an artificial resin, generally of the urea-formaldehyde or phenol-formaldehyde type. The function of the resin is to give the propellant mechanical strength and at the same time improve its burning characteristics. Thus, in the manufacture of a suitable propellant, proper proportions of finely divided oxidizer and finely divided para-carborane can be admixed with a high solids content solution of partially condensed urea-formaldehyde or phenol-formaldehyde resin, the proportions being such that the amount of resin is about 5 to 10 percent by weight based upon the weight of the oxidizer and the boron compound. The ingredients can be thoroughly mixed with a simultaneous removal of solvent, and following this the solvent free mixture can be molded into the desired shape as by extrusion. Thereafter the resin can be cured by resorting to heating at moderate temperatures. For further information concerning the formulation of solid propellant compositions, reference is made to U.S. Patent 2,622,277 to Bonnell and to U.S. Patent 2,646,596 to Thomas.

What is claimed is:

1. A method for preparing para-carborane which comprises heating a material selected from the group consisting of orthocarborane and meta-carborane and mixtures thereof at a temperature of from about 585° C. to about 620° C. to form a reaction mixture containing para-carborane and recovering the said para-carborane from the reaction mixture.

2. The method of claim 1 wherein the said material is ortho-carborane.

3. The method of claim 1 wherein the said material is meta-carborane.

4. The compound para-carborane having structural formula FIGURE 1–B as shown in accompanying drawing.

References Cited

Grafstein et al.: "Journal of Inorganic Chem.," vol. 2, No. 6 (1963), p. 1128.

Schroeder et al.: "Journal of Inorganic Chem.," vol. 2, No. 6 (1963), pp. 1317 to 1319.

TOBIAS E. LEVOW, *Primary Examiner.*

W. F. W. BELLAMY, *Assistant Examiner.*